US009092913B2

(12) United States Patent
Güner

(10) Patent No.: US 9,092,913 B2
(45) Date of Patent: Jul. 28, 2015

(54) METHOD FOR PROVIDING LOCATION-SPECIFIC DATA SERVICES

(75) Inventor: Refi-Tugrul Güner, Baden (AT)

(73) Assignee: Kapsch TrafficCom AG, Vienna (AT)

( * ) Notice: Subject to any disclaimer, the term of this patent is extended or adjusted under 35 U.S.C. 154(b) by 704 days.

(21) Appl. No.: 13/409,706

(22) Filed: Mar. 1, 2012

(65) Prior Publication Data

US 2012/0231815 A1 Sep. 13, 2012

(30) Foreign Application Priority Data

Mar. 11, 2011 (EP) .................................... 11450034

(51) Int. Cl.
*H04W 24/00* (2009.01)
*G07B 15/06* (2011.01)

(52) U.S. Cl.
CPC .................................... *G07B 15/063* (2013.01)

(58) Field of Classification Search
USPC ........... 455/456.3; 370/338; 340/928; 705/13
See application file for complete search history.

(56) References Cited

U.S. PATENT DOCUMENTS

| | | | | |
|---|---|---|---|---|
| 7,010,267 | B2 | 3/2006 | Vanluijt et al. | |
| 2009/0281689 | A1 * | 11/2009 | Suganuma et al. | 701/35 |
| 2010/0265867 | A1 * | 10/2010 | Becker et al. | 370/312 |

FOREIGN PATENT DOCUMENTS

| | | | | |
|---|---|---|---|---|
| EP | 1 253 791 | A1 | 10/2002 | |
| EP | 1 271 416 | A1 | 1/2003 | |
| EP | 1 431 946 | A1 | 6/2004 | |
| EP | 1431946 | A1 * | 6/2004 | G08G 1/01 |
| WO | WO 01/01711 | A1 | 1/2001 | |
| WO | WO 03/025789 | A1 | 3/2003 | |
| WO | WO 2004/075122 | A1 | 9/2004 | |

OTHER PUBLICATIONS

Extended European Search Report for corresponding European Patent Application No. 11450034.1, dated Aug. 19, 2011, 8pp.

* cited by examiner

*Primary Examiner* — Marcos Batista
(74) *Attorney, Agent, or Firm* — Fiala & Weaver P.L.L.C.

(57) ABSTRACT

A method for providing location-specific data services to vehicles that carry onboard units for short-range communication with tolling stations at known locations in a road-tolling system and mobile terminals for data reception in a mobile communication network. The method includes: storing a list of service IDs, a mapping between a device ID and a terminal ID, and at least one booking of a service ID for a device or terminal ID within the road tolling system; transmitting the device ID of an onboard unit to the tolling station; retrieving the booking of the service ID for the device ID or the mapped terminal ID; testing whether the service ID from this booking is included in the service ID list, and if so, transmitting of the mapped terminal ID to the data service; and providing this data service via the mobile communication network to the mobile terminal.

8 Claims, 2 Drawing Sheets

METHOD FOR PROVIDING LOCATION-SPECIFIC DATA SERVICES

CROSS-REFERENCE TO RELATED APPLICATION(S)

This application claims priority to European Patent Application No. 11 450 034.1, filed on Mar. 11, 2011, the contents of which are hereby expressly incorporated by reference.

FIELD OF THE INVENTION

The present invention relates to a method for providing location-specific data services to vehicles that are equipped with onboard units for short-range communication with toll stations at known positions in a road-tolling system, as well as mobile terminals for receiving data in a mobile communication network.

BACKGROUND

Road tolling systems that employ a network of geographically distributed toll stations with locally bounded communication zones to localize vehicles to the location of the tolling station via short-range communication with their on-board units (OBUs) are distinguished by their high reliability and precise localization. However, the quantity of data that can be exchanged via these short-range communications is sharply limited by the limited range thereof and the speed of the vehicles. In general, only a brief data message is possible, which must contain the device code of the onboard unit to identify it within the road tolling system before the vehicle again leaves the communication zone of a tolling station.

High-volume mobile data services are currently used over 2G, 3G or 4G mobile communication networks (e.g., GPRS, UMTS or LTE, etc.) with mobile terminals such as mobile telephones, PDAs, handheld PCs, tablets, etc., which are brought by the user in the vehicle or can be integrated into the vehicle or the onboard unit thereof. However, the localization precision of mobile terminals in these mobile communication networks is greatly limited for the purpose of location-specific data services, even if additional GPS receivers are installed, and also has the consequence of increased data traffic in the mobile communication network, with corresponding additional costs.

SUMMARY

In some embodiments, the present invention combines the advantages of known technologies together to provide vehicles with location-specific data services with high data volumes and high location precision.

In some embodiments, the present invention is a method for providing location-specific data services to vehicles that carry onboard units for short-range communication with tolling stations at known locations in a road-tolling system as well as mobile terminals for data reception in a mobile communication network. The onboard units have unique device IDs, the mobile terminals have unique terminal IDs, and the data services have unique service IDs. The method includes: storing a list of service IDs of data services related to the location of a tolling station, a mapping between the device ID and the terminal ID of a vehicle, and at least one booking of a service ID for a device or terminal ID within the road tolling system; transmitting the device ID of an onboard unit passing the tolling station, to the tolling station by short-range communication; retrieving the booking of the service ID for said device ID or the terminal ID mapped to the device ID; testing whether the service ID from said booking is included in the service ID list of location-specific data services for said tolling station; when the service ID is included in the service ID list, transmitting the terminal ID mapped to the device ID to the data service identified by the service ID; and providing said data service via the mobile communication network to the mobile terminal identified by the terminal ID.

In some embodiments, the list of service IDs of the data services related to a tolling station at the location is stored in the same tolling station, and the retrieval of the service ID entry for the named device or assigned terminal ID take place in the same tolling station, which enables a rapid on-site reaction—i.e. in this tolling station—to this passing onboard unit, without the tolling station needing to refer to a remote proxy or control center.

In some embodiments of the invention, the location-specificity of the data service is ensured by means of its service ID, i.e., each service ID stands for a data service that is specific to the tolling station location. In some embodiments of the invention, the tolling station location is also sent along with the terminal ID to the identified data service, so that the data service can more precisely adapt its services or data to the tolling station location. For example, a data service identified by its service ID may be available over a greater area with multiple tolling stations, adapting its data or services specifically to the tolling station location currently relayed.

In some embodiments of the invention, the service ID entry is stored in a list at the tolling station or at a control center of the road tolling system, and said retrieval of the service ID entry takes place with reference to this list in the tolling station or control center. The user can for example enter the desired data services under his/her device or terminal ID into a central list of the road tolling system, which can then optionally be distributed to all tolling stations. Communication between the onboard unit and tolling station can thus be kept to a minimum and also requires no modification with respect to the customary road tolling standards.

Alternatively, the service ID entry can be stored in the onboard unit, and said retrieval of the service ID entry takes place by this/these booked service ID(s) being sent to the tolling station together with the device and/or terminal ID of the onboard unit. In this variation, the user does not have to book his/her services centrally in the road tolling system, but can do it locally on his/her onboard unit, which affords clear runtime advantages in the processing of the service, particularly for locally restricted services.

The specified mapping between device ID and terminal ID can also be done at different places in the system. In a first variation, the mapping between device ID and terminal ID is stored in a list at a control center of the road tolling system, by means whereof it is sent to the data service, and whereat the terminal ID mapped to the device ID is retrieved with reference to the list. This thus requires a corresponding central registration in the road tolling system, but simplifies communication between onboard units and tolling stations. The specified mapping list can also be distributed to the tolling stations by the control center, so that the terminal ID assigned to the device ID can be retrieved with reference to the local list in the tolling station, which enables accelerated processing.

In a further variation, the terminal ID mapped to the device ID can be stored within the onboard unit and sent by this unit to the tolling station, which eliminates the need for a central registration but also requires corresponding modification to the short-range communication.

The method of the invention is suited for an arbitrary road tolling system, with any of the different types of short-range communication, e.g. infrared, radio frequency identification (RFID) or wireless local area network (WLAN). It is especially advantageous if the short-range communication follows the dedicated short range communication (DSRC) or wireless access in a vehicle environment (WAVE) standards, which are widely used in road tolling systems with geographically distributed tolling stations.

BRIEF DESCRIPTION OF THE DRAWINGS

Hereinafter, the invention will be described in greater detail with reference to the embodiments presented in the attached drawings. Referring to the drawings.

DETAILED DESCRIPTION

The present invention depends on the understanding that a high-volume data service with high localization precision can be provided via the present infrastructure of a network of geographically distributed tolling stations in a road tolling system in combination with a mobile communication network. At every tolling station—or delegated to a proxy or a control center of the road tolling system—the data services booked by a passing onboard unit are compared to the data services available at the tolling station location, so as to prevent unnecessary data traffic and the disturbance of the driver by irrelevant information. The driver can subscribe or book precisely those data services that are of interest or relevant to safe operation. So, for example, traffic-relevant information with a high data volume, e.g. graphically complex traffic maps, weather maps showing precipitation and freezing zones, etc., can be provided in a location-specific way, and location-specific application calls can be initiated, e.g. mobile-terminal payment transactions, etc. The term "data service" used herein in this sense includes arbitrary applications including those named above.

It may be mentioned here that the broadcasting of Bluetooth-beacon advertising links (URLs) to passing mobile telephone users has been disclosed in U.S. Pat. No. 7,010,267 and WO 2001/01711 for the distribution of location-specific advertising, in order to prompt these users to call up additional information via the mobile internet. A solution of this type requires a separate network of Bluetooth beacons and is unsuited for safety-relevant traffic applications, since it requires the attention and interaction of the user for information exchange, which puts the safe operation of the vehicle at risk.

Figure 1:
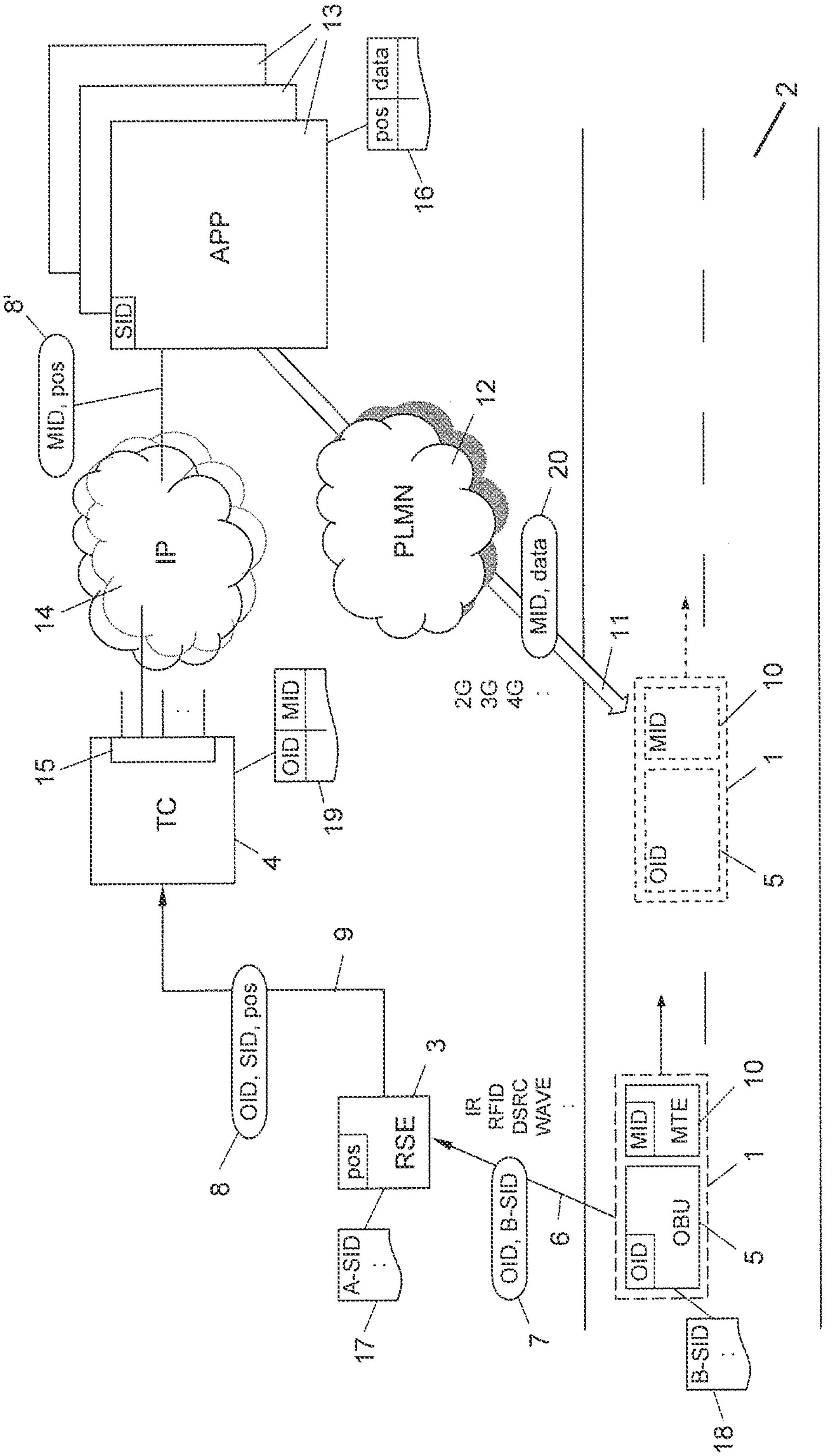
FIG. 1 shows an exemplary method in the context of a schematically-rendered road tolling system, according to some embodiments of the present invention.

As shown in FIG. 1, vehicles 1 move on a road 2 in the context of a road tolling system, which comprises a plurality of geographically distributed tolling stations 3 (only one shown) and at least one control center 4. The vehicles 1 carry vehicle devices or onboard units (OBUs) 5, which can engage in short-range communication 6, i.e., wireless communication over tightly circumscribed ranges with the tolling stations 3, when they pass these or enter their range.

The onboard units 5 have unique device IDs (OBU IDs) OID within the road tolling system with which they identify themselves (report 7) to the tolling stations 3 in the course of short-range communication 6. After an onboard unit 5 has passed, a tolling station 3 can transmit a tolling transaction 8 to the control center 4 via a data connection 9. This tolling transaction 8 includes at least the device ID OID of the onboard unit 5 and the location pos of the tolling station 3. The tolling station location pos can also be furnished in the form of a unique ID of the tolling station 3 if the control center 4 knows the locations of the tolling stations 3.

In the control center 4, a toll or fee can be imposed for a use of the tolling station location pos by the vehicle 1 based on the received tolling transactions 8; for example, the traversal of a tolled road, entry into a toll-mandatory district, or staying at a toll-mandatory location, etc., as will be understood by a person of skill in the art.

For the short-range transmissions 6, different technologies can be employed, such as infrared (IR), radio frequency identification (RFID), dedicated short range communication (DSRC), wireless local area net (WLAN), wireless access in a vehicle environment (WAVE), ZigBee®, Bluetooth®, etc. It is preferred that it be a DSRC or WAVE connections, which are employed in typical road tolling systems.

The vehicle 1 carries a mobile terminal 10 in addition to the onboard unit 5, which may be integrated into the onboard unit 5, connected to it or separate from it. The mobile terminal 10 is a mobile terminal device for data reception 11 in a mobile communication network 12 of the second, third, fourth, etc. generation (2G, 3G, 4G etc.), in accordance with the GSM, UMTS, LTE or WIMAX standard. The mobile terminal 10 may be a mobile transceiver integrated into the onboard unit 5 or a tablet, handheld PC or mobile telephone designed for data reception, and may be "stand-alone" or integrated into an electronic system of the vehicle 1.

The mobile terminal 10 is identified in the mobile communication network 12 by a unique terminal ID (mobile ID) MID. The terminal ID MID can for example be a telephone number, IMSI, IMEI or IP address in the mobile communication network 12.

Via the mobile communication network 12, location-specific data services 13 can be received in the mobile terminal 10 or used by it, e.g., interactively. The data services 13 are, for example, registered to one or more application servers (not shown), which are connected to the mobile communication network 12 directly or via corresponding gateways.

The data services 13 are further connected via data connections 14, for example, the Internet, to the tolling stations 3, and e.g., via the control center 4 of the road tolling system. The control center 4 can have for example an Internet gateway 15 for communication with Internet-based data services 13. If the control center 4 is absent, the data services 13 or the application servers that provide them are connected directly to the tolling stations 3 via the data connections 9, 14.

The data services 13 have a unique service ID SID by which they can be identified, e.g., a URL (uniform resource locator) in the World Wide Web. Every data service 13 is specifically for the location pos of one (or more) tolling stations 3, i.e. a location-specific data service in this sense. In addition, a data service 13 can also provide data specifically adapted to the current tolling station location pos or provide "data" to services, as symbolized by the list 16.

The tolling station 3 contains its own list 17 with the service ID SID of those data services 13 that are available or providable for its location. The entries in the service ID list 17 are here indicated as "A-SID" (available SIDs).

In the onboard unit 5, there is likewise a list 18 of the data services 13 desired or "entered" by it, respectively referenced by a service ID SID, and indicated in the list 18 as "B-SID" (booked SIDs). Every entry in the list 18 thus represents a "service ID booking" of the OBU 5 with the device ID OID with respect to a data service 13 with the service ID SID. The list 18 can be stored in the OBU 5 upon preparing the OBU 5 or furnishing it to the user, and/or installed or modified via a user interface or "on the fly", during operation.

Upon passing a tolling station 3, in the course of short-range communication 6, the OBU 5 also relays the list 18 of the data services booked by its B-SID as well as its device ID OID (see report 7). At the tolling station 3, it is checked whether one (or more) of the booked service IDs B-SID is included in the list 17 of data services 13 available at the tolling station location pos. If so, i.e., if a booked service ID B-SID matches an available service ID A-SID, this service ID (A- or B-) SID is sent to the control center 4 via the data connection 9 as a toll transaction 8 together with the device ID OID and optionally, the tolling station location pos.

The service ID list 17 may alternatively be held in the control center 4 or at an intermediate proxy computer (not shown), rather than in the tolling station 3. In this case, the comparison between the booked data services B-SID and the data services available at the tolling station location A-SID can also be outsourced to the control center 4 or the proxy computer.

A list of mappings 19 between the device IDs OID of the onboard units 5 and the terminal IDs MID of the mobile terminals 10 is kept in the control center 4. To construct the list 19, the user of the vehicle 1 can for example register at the control center 4 with his/her device and terminal IDs OID, MID, e.g., via the Internet 14 or a Point-of-Sale Terminal (not shown) connected to the control center 4.

At the control center 4, the terminal ID MID that maps to a received device ID OID is retrieved based on the list 19, and is entered in a modified transaction report (8') instead of (or in addition to) the device ID OID. This report is sent via the Internet 14 to the data service 13 indicated by the service ID SID. The data service 13 with the service ID SID receives the terminal ID MID and provided it is available (report 20) at multiple station locations pos (optionally also the station location), and provides its location-specific data, that is data possibly dependent on location, via the mobile communication network 12 to the mobile terminal 10 identified by the terminal ID MID. The mobile terminal 10 can respond directly to the receipt of the report 20 and use or display the location-specific data of the service 13 contained therein. However, if there is a connection between the onboard unit 5 and mobile terminal 10, the mobile terminal 10 can be put into a standby mode by the onboard unit 5.

The location specific data (report 20) can for example be an SMS, voice-mail, the display of a website or graphic, or a "remote process call" (RPC) to start or trigger an application.

Figure 2:
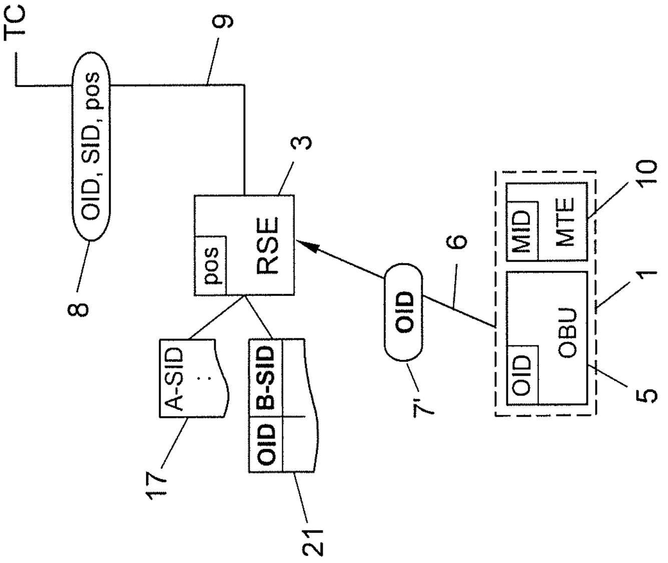
FIGS. 2 and 3 show variations of the method of FIG. 1 with reference to a section of the road tolling system of FIG. 1, according to some embodiments of the present invention.

FIG. 2 shows a variation of the method of FIG. 1, wherein the service ID bookings of the onboard unit 5 are not stored therein, but in a list 21 at the tolling station 3. The list 21 contains the service IDs B-SID booked to a device ID OID. In some embodiments, the list 21 is distributed by the control center 4 to all its tolling stations, and can for example be provided when furnishing the list 19. The onboard unit 5 therefore only needs to send its device ID OID (report 7) to a tolling station 3 in the usual manner by a short-range communication 6. The tolling station 3 retrieves the data services or service IDs B-SID booked for the received device ID OID based on the booking list 21, to compare it with the list 17 of the available service IDs A-SID and in the case of a match, to transmit the reports 8,8' to the corresponding data service 13 via the control center 4.

Figure 3:
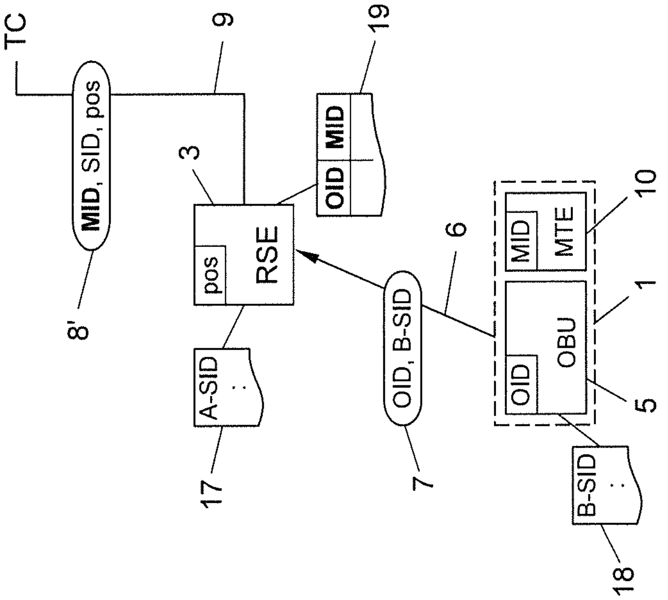

FIG. 3 shows a further embodiment of the method of FIGS. 1 and 2, wherein the list 19 is furnished directly to the tolling station 3. The mapping of the terminal ID MID to the device ID OID here occurs right at the tolling station 3, so that a modified report 8' can be transmitted via the data connection 9 to the control center 4, wherein the terminal ID MID appears in place of the device ID OID. It will be apparent that this variation can be combined with the embodiment of FIG. 1 as well as with that of FIG. 2.

A further variation of the mapping between device ID OID and terminal ID MID involves the terminal ID MID being stored directly in the OBU 5 with the device ID OID thereof, or the OBU 5, if this is connected with the mobile terminal 10—containing the terminal's terminal ID MID. In this case, the terminal ID MID can be sent to the tolling station 3 instead of (or in addition to) the device ID OID in the report 7 or 7'. This variation can also be combined with each of the embodiments shown in FIGS. 1-3.

Billing for the location-specific data or data services 13 can be performed by the control center 4, by the application server of the data services and/or by the operator of the mobile communication network 12.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A method for providing location-specific data services to vehicles that carry onboard units for short-range communication with tolling stations at known locations in a road-tolling system as well as mobile terminals for data reception in a mobile communication network, wherein the onboard units have unique device IDs, the mobile terminals have unique terminal IDs, and the data services have unique service IDs and are registered to one or more application servers, which are connected to the mobile communication network, and are connected via data connections to the tolling stations, comprising:

storing a list of service IDs of data services related to the location of a tolling station within said tolling station, a mapping between the device ID and the terminal ID of a vehicle within the road tolling system, and at least one booking of a service ID for a device or terminal ID within the road tolling system;

transmitting the device ID of an onboard unit passing the tolling station, to the tolling station by short-range communication;

retrieving the booking of the service ID for said device ID or the terminal ID mapped to the device ID;

testing whether the service ID from said booking is included in the service ID list of location-specific data services for said tolling station;

when the service ID is included in the service ID list, transmitting the terminal ID mapped to the device ID to the data service identified by the service ID; and providing location-specific data by said data service via the mobile communication network to the mobile terminal identified by the terminal ID.

2. The method of claim 1, wherein the tolling station location is sent to the identified data service along with the terminal ID, and is utilized by the service.

3. The method of claim 1, wherein the booking of the service ID is stored in a list at the tolling station and said retrieval of the booking of the service ID is done at the tolling station with reference to said list.

4. The method of claim 1, wherein the booking of the service ID is stored in the onboard unit and said retrieval of the booking of the service ID is done by sending the booking of the service ID to the tolling station together with one or more of the device ID and the terminal ID.

5. The method of claim 1, wherein the data connections, via which the data services are connected to the tolling stations, include a control center of the road tolling system, and wherein the mapping between the device ID and the terminal ID is stored in a list at the control center of the road tolling system, via which the transmission to the data service takes place and where the terminal ID mapped to the device ID is retrieved with reference to the list.

6. The method of claim 1, wherein the mapping between the device ID and the terminal ID is stored in a list at the tolling station, where the terminal ID mapped to the device ID is retrieved with reference to the list.

7. The method of claim 1, wherein the terminal ID mapped to the device ID is stored in the onboard unit and sent by the onboard unit to the tolling station.

8. The method of claim 1, wherein the short-range communication takes place according to the DSRC or WAVE standard.

* * * * *